US006999386B2

(12) United States Patent
Sugimoto et al.

(10) Patent No.: US 6,999,386 B2
(45) Date of Patent: Feb. 14, 2006

(54) DRIVE, METHOD FOR READING DATA, INFORMATION RECORDING MEDIUM REPRODUCTION APPARATUS, AND METHOD FOR REPRODUCING DATA HAVING READING ERRORS

(75) Inventors: Hiroshi Sugimoto, Osaka (JP); Hirofumi Ide, Hyogo (JP); Hiroshi Ueda, Osaka (JP); Kenji Takauchi, Osaka (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 887 days.

(21) Appl. No.: 09/808,641

(22) Filed: Mar. 14, 2001

(65) Prior Publication Data

US 2001/0028608 A1    Oct. 11, 2001

(30) Foreign Application Priority Data

Mar. 17, 2000    (JP)    ............................. 2000-076197

(51) Int. Cl.
G11B 21/08    (2006.01)
(52) U.S. Cl. .............................. 369/30.22; 369/53.35; 714/53
(58) Field of Classification Search ............. 369/30.22, 369/30.21, 30.18, 30.11, 30.09, 30.03, 53.12, 369/53.18, 53.35, 53.42; 386/125, 126, 113, 386/116, 124; 714/48, 51, 53, 54, 57
See application file for complete search history.

(56) References Cited

U.S. PATENT DOCUMENTS

| | | | | |
|---|---|---|---|---|
| 5,764,881 A | * | 6/1998 | Yoshida | .......................... 714/8 |
| 5,771,331 A | * | 6/1998 | Aoki et al. | .................... 386/68 |
| 5,917,792 A | * | 6/1999 | Shigenobu et al. | ....... 369/275.3 |
| 6,072,755 A | * | 6/2000 | Kim et al. | ................ 369/30.06 |
| 6,088,818 A | * | 7/2000 | Andoh et al. | ................ 714/703 |
| 6,304,405 B1 | * | 10/2001 | Asano et al. | ............. 306/73.03 |
| 6,421,308 B1 | * | 7/2002 | Kizu et al. | ................ 369/53.17 |
| 6,493,297 B1 | * | 12/2002 | Isono et al. | ............. 369/44.34 |
| 6,523,142 B1 | * | 2/2003 | Igari et al. | ...................... 714/55 |
| 6,639,885 B1 | * | 10/2003 | Yada et al. | ............. 369/53.45 |
| 6,654,901 B1 | * | 11/2003 | Nakai et al. | .................... 714/1 |
| 6,701,413 B1 | * | 3/2004 | Shirai et al. | ................ 711/137 |
| 6,862,151 B1 | * | 3/2005 | Hoskins et al. | ............... 360/53 |
| 2002/0144186 A1 | * | 10/2002 | Ito | .............................. 714/42 |

FOREIGN PATENT DOCUMENTS

WO    00/45386    8/2000

OTHER PUBLICATIONS

Ito et al.; "Proposal for a Small Form Factor Committee Specification of: Mt. Fuji Commands for Multimedia Devices"; SFF8090i v5, Revision 1.02, Oct. 25, 2000, pp. 172-173, pp. 335-337.

* cited by examiner

Primary Examiner—Tan Dinh
(74) Attorney, Agent, or Firm—Renner, Otto, Boisselle & Sklar, LLP

(57) ABSTRACT

A method for reading data from an information recording medium having a plurality of address regions, includes the steps of: performing a reading operation for all of designated address regions among the plurality of address regions while holding read error information regarding the read error in the case where a read error occurs during reading of data from one of the plurality of address regions; transferring the read data to a data conversion device for converting the read data; and transferring the read error information to the data conversion device.

34 Claims, 11 Drawing Sheets

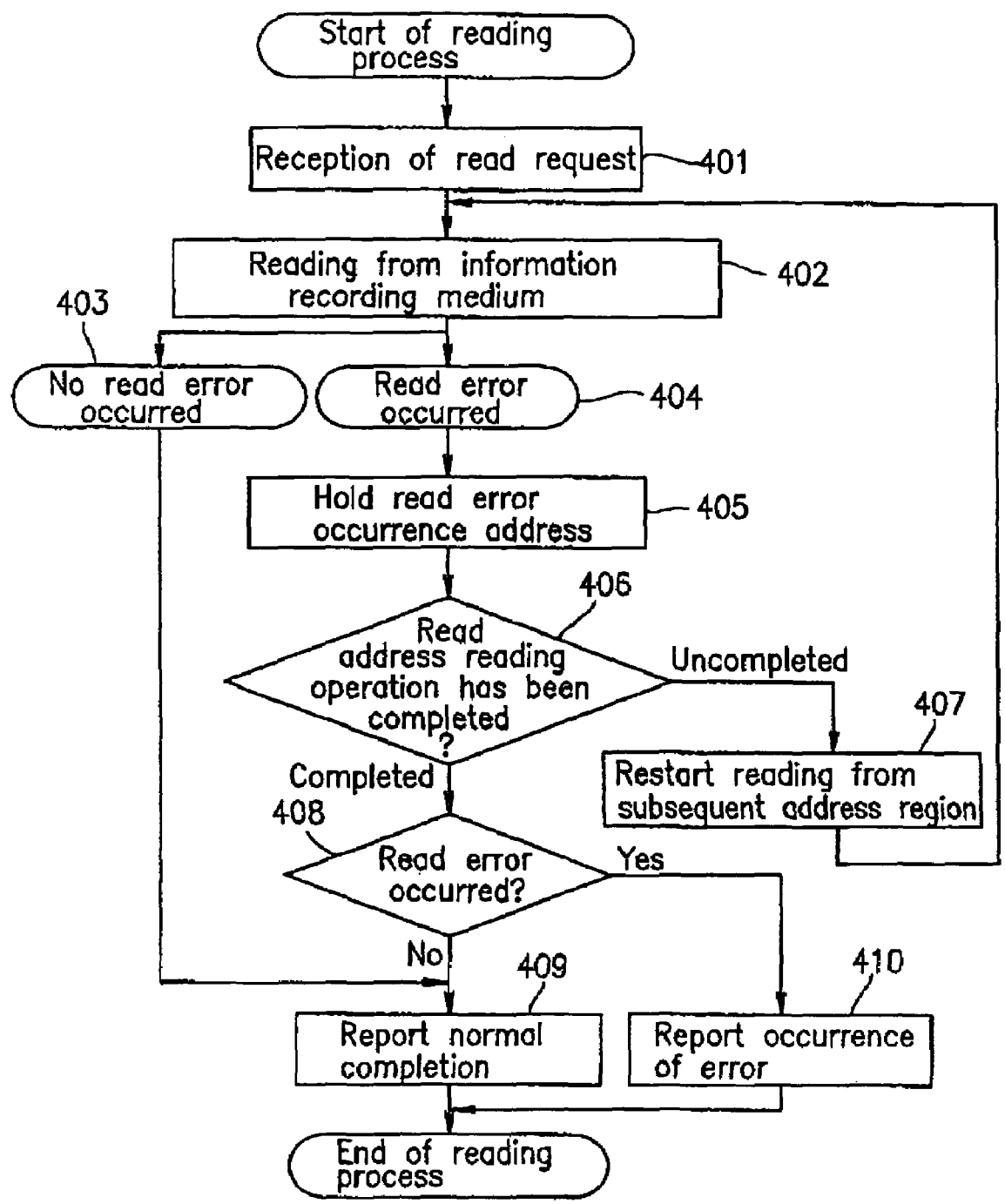

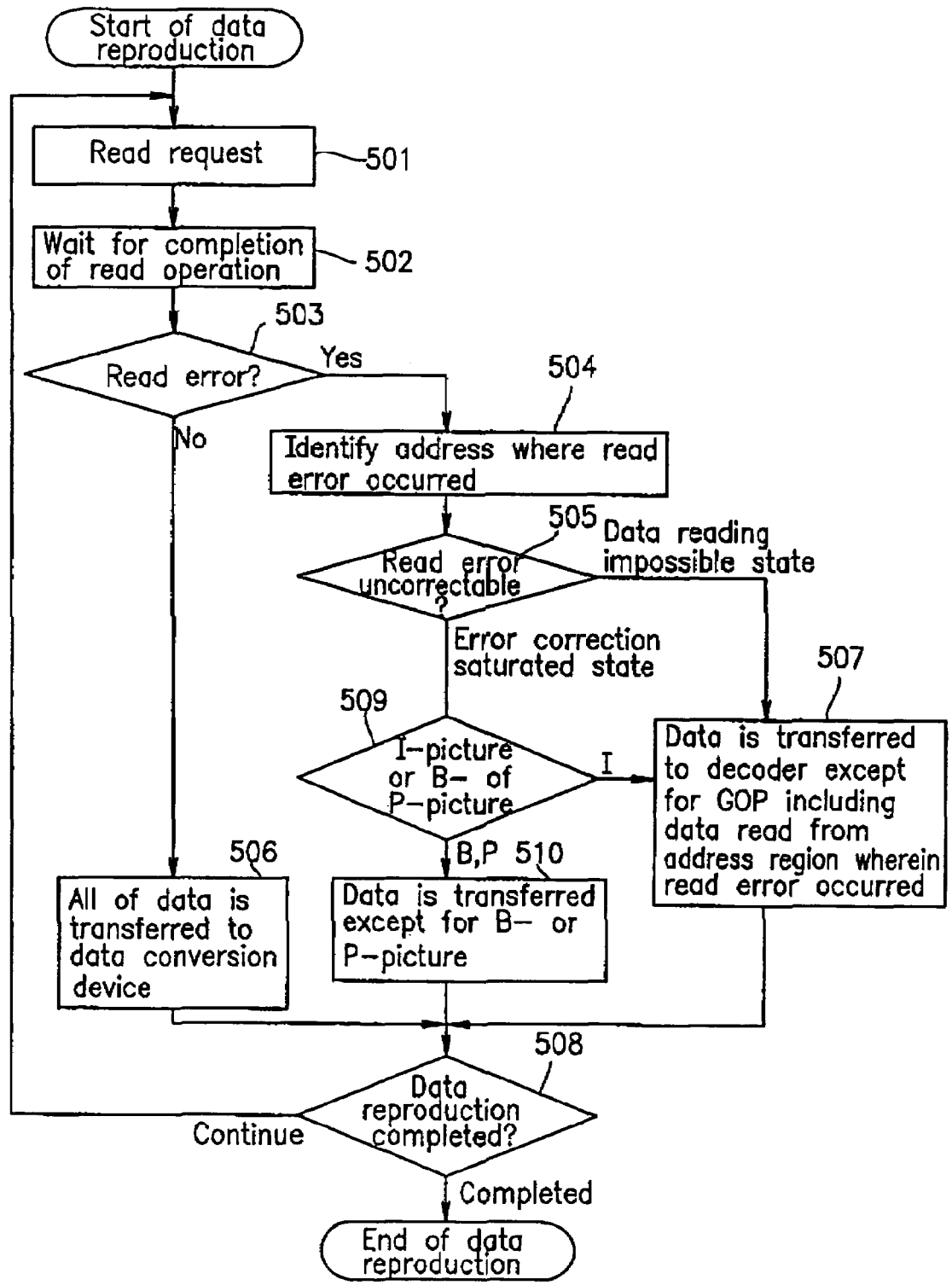

DRIVE, METHOD FOR READING DATA, INFORMATION RECORDING MEDIUM REPRODUCTION APPARATUS, AND METHOD FOR REPRODUCING DATA HAVING READING ERRORS

BACKGROUND OF THE INVENTION

1. Field of the Invention

The present invention relates to a drive and a method for reading data from an information recording medium having a plurality of address regions, and to an information recording medium reproduction apparatus and a method for reproducing data using read error information generated during reading of the data from the information recording medium.

2. Description of the Related Art

An optical disk is known as an information recording medium having a plurality of address regions for storing data. The optical disk has a large capacity and is capable of digitally storing high-quality data. DVDs (Digital Versatile Discs), which have a particularly large capacity among various optical disks, and DVD recording/reproduction apparatuses for recording data into/reproducing information from data stored in the DVDs have been merchandised. The optical disks are expected to store not only computer programs but also real-time data (e.g., AV data) including at least one of sound data and video data. It is anticipated that optical disks used as digital information recording media will be further developed in the future.

At present, as well as an optical disk for reproduction only in which data is recorded by a disk manufacturer in the form of prepits, such as RO-CD and RO-DVD, a recordable optical disk in which a user can record data at home, such as a DVD-RAM, etc., has been developed. Development of an optical disk video recorder which uses DVD-RAMs for recording/reproduction of television broadcasting, or the like, which can be substituted for conventional video tape recorder, such as a VHS recorder, is now proceeding.

For an optical disk in which data can be recorded at high density by non-contact recording, a tracking control technique for allowing laser light to stably follow tracks and lands previously formed in the optical disk, a focus control technique for forming a very small laser spot, and a laser power control technique for achieving a stable output power are required. These control techniques have been demanded to provide control with more accuracy along with the increase in data recording density of the optical disk. These control techniques are used for carrying out systematic recovery processing, whereby stable recording/reproduction can be achieved.

However, it is sometimes impossible to correctly regenerate data from an information recording medium such as an optical disk. Specifically, it may be impossible to correctly read out data due to defects on the optical disk, such as flaws, a fingerprint, etc., or due to defects caused during reading of data. In the case where data recorded in the optical disk is real-time data, the data is generally stored in the form of digital data compressed according to an MPEG format. In this case, a P-picture (Predictive-picture) and a B-picture (Bidirectionally predictive-picture) are predicted based on an I-picture (Intra-picture). Therefore, if data concerning the I-picture used as a reference is not correctly read out, an output image is significantly affected by such incorrectness. Furthermore, data for real-time reproduction, such as real-time data, should be sequentially read out because there is only a little time to carry out a systematic recovery processing.

FIG. 6 schematically shows a conventional information recording medium reproduction apparatus 600. The information recording medium reproduction apparatus 600 includes a drive 610, a host system 630, and a connection bus 620 for connecting the drive 610 and the host system 630. The host system 630 is connected to an output device 640. An optical disk 615 is loaded on the drive 610. The host system 630 includes a data conversion device 635.

In response to a read request from the host system 630, the drive 610 reads data from the optical disk 615. The read data is transmitted to the host system 630 through the connection bus 620. The transmitted data is converted by the data conversion device 635 of the host system 630 and output to the output device 640 such as a television. When the drive 610 reads the data from the optical disk 615, a read error may occur.

FIG. 7 is a flowchart illustrating a conventional data reading method. In this method, when an error occurred during reading of the data, the drive 610 reports to the host system 630 in which address the error occurred.

At the first step of a reading process, the drive 610 receives from the host system 630 a read request to read data from designated address regions (Step 701). In response to the read request, the drive 610 reads the data from the optical disk 615 (Step 702).

In the case where a read error did not occur during the reading of data from the optical disk 615 (Stop 703), the drive 610 reports to the host system 630 that a reading operation from the optical disk 615 has been completed, and transmits the normally read data to the host system 630 (Step 704), thereby terminating the reading process.

Alternatively, in the case where a read error occurred during the reading of data from the optical disk 615 (Step 705), the drive 610 stops a reading operation from the optical disk 615. Then, the drive 610 reports to the host system 630 that the read error occurred and the reading operation has been stopped halfway, and in which address region the error occurred. Then, the drive 610 transmits all of data read from the optical disk 615 to the host system 630 (Step 706), thereby terminating the reading process.

Thus, in this data reading method, in the case where a read error occurred during the reading of data from the optical disk 615, the host system 630 can identify the address region in which the read error occurred and can reproduce information from all of data which had been successfully read out from the optical disk 615 before the error occurred. However, the reading operation stops before all of data has been read from all of the designated address regions.

FIG. 8 is a flowchart illustrating another conventional data reading method. In this method, even when an error occurs during the reading of data, the drive 610 keeps reading data on a real-time basis from the optical disk 615 without reporting to the host system 630 in which address region the error occurred.

At the first step of a reading process, the drive 610 receives from the host system 630 a read request to read data from designated address regions (Step 801). In response to the read request, the drive 610 reads data from the optical disk 615 (Step 802).

In the case where a read error did not occur during the reading of data from the optical disk 615 (Step 803), the drive 610 reports to the host system 630 that a reading operation from the optical disk 615 has been completed, and transmits the normally read data to the host system 630 (Step 807), thereby terminating the reading process.

Alternatively, in the case where a read error occurred during the reading of data from designated address regions in the optical disk 615 (Step 804), the drive 610 determines whether or not the reading of data from all of the designated address regions in the optical disk 615 has been completed without ceasing the reading operation (Step 805). When the reading operation has not completed, the reading operation is restarted from an address region subsequent to the address region in which the read error occurred (Step 806). Then, the steps 802 through 806 are repeated until the reading operation from all of the designated address regions in the optical disk 615 is completed. When the reading operation from all of the designated address regions in the optical disk 615 has been completed (step 805), the drive 610 reports to the host system 630 that the reading operation from the optical disk 615 has been completed, and transmits the read data to the host system 630 (step 807), thereby terminating the reading process.

In this data reading method, the drive 610 continues a reading operation even when a read error occurred, and the host system 630 finally reproduces information from all of the data read from designated address regions. However, according to this data reading methods occurrence of a read error is not reported to the host system 630.

FIG. 9 is a flowchart illustrating a conventional data reproduction method used in the host system 630 which gives a read request to a drive 610 which is controlled by the conventional data reading method described with reference to FIG. 7 or 8. Herein, it is assumed that the host system 630 requests the drive 610 to read real-time data from the optical disk 615. The real-time data is generally recorded in the form of data compressed according to the MPEG format. Therefore, an MPEG decoder is used as a data conversion device 635.

The host system 630 determines a first sector address in the optical disk 615 from which data is to be read out for reproduction, and issues to the drive 610 a read request to read data from designated address regions (Step 901). After issuing the read request to the drive 610, the host system 630 waits to receive a read operation completion signal from the drive 610 which indicates the completion of a reading operation (Step 902). After receiving the read operation completion signal, the host system 630 determines the result of the reading operation of the drive 610 (Step 903).

In the case where an occurrence of a read error is not reported to the host system 630, the host system 630 transmits all of the read data to the decoder 635 which performs MPEG decoding (Step 904).

In the case where data is read out according to the data reading method shown in FIG. 8, even when a read error occurred during the reading of data, the occurrence of the read error is not reported to the host system 630. In this case, incorrect, undecodable data may be transmitted to the decoder 635. Since the decoder 635 attempts to decode such incorrect data but cannot decode correctly, the motion of an output image stops as if it is frozen.

On the other hand, in the case where data is read out according to the data reading method shown in FIG. 7, when a read error occurred during the reading of data, the occurrence of the read error is reported to the host system 630 (Step 903). In this case, a reading operation from the optical disk 615 is stopped due to the read error. The drive 610 transmits only correct data which had been read before the occurrence of the read error except for the data read from an address region in which the read error occurred (Step 905). Then, the host system 630 designates an address region subsequent to the address region wherein the read error occurred, and allows the drive 610 to restart a reading operation from the designated address region (step 906). In this case, since the reading operation is stopped once, data transmission to the decoder 635 is temporarily interrupted.

Data reading from the optical disk 615 and data transmission to the decoder 635 are repeated until the decoder 635 receives all of the data read from the designated address regions in the optical disk 615 according to one of the above-described data reading methods (Step 907).

SUMMARY OF THE INVENTION

According to one aspect of the present invention, a method for reading data from an information recording medium having a plurality of address regions includes the steps of: performing a reading operation for all of designated address regions among the plurality of address regions while holding read error information regarding the read error in the case where a read error occurs during reading of data from one of the plurality of address regions; transferring the read data to a data conversion device for converting the read data; and transferring the read error information to the data conversion device.

In one embodiment of the present invention, the read error information includes read error presence/absence information indicating presence/absence of the read error.

In another embodiment of the present invention, the read error information includes read error factor information indicating a factor which caused the read error and read error occurrence address information indicating an address region wherein the read error occurred.

In still another embodiment of the present invention, the step of performing the reading operation includes holding the read data; and the step of transferring the read error information includes a step of transferring the read error occurrence address information and a state of the held data to the data conversion device.

In still another embodiment of the present invention, the step of transferring the read error information includes a step of attaching the read error occurrence address information and the read error factor information as headers to the data read from the information recording medium.

According to another aspect of the present invention, a drive includes: a reading section for reading data from an information recording medium having a plurality of address regions, wherein, in the case where a read error occurs during reading of data from one of the plurality of address regions, the reading section generates read error information regarding the read error, and the reading section performs a reading operation for all of designated address regions among the plurality of address regions; a data holding section for holding the read data and the read error information; and a control section for controlling the reading section and the data holding section, wherein the control section transfers the read data to a data conversion device for converting the read data, and the control section transfers the read error information to the data conversion device.

In one embodiment of the present invention, the read error information includes read error presence/absence information indicating presence/absence of the read error.

In another embodiment of the present invention, the read error information includes read error factor information indicating a factor which caused the read error and read error occurrence address information indicating an address region wherein the read error occurred.

In still another embodiment of the present invention, the control section transfers the read error occurrence address information and a state of the held data to the data conversion device.

In still another embodiment of the present invention, in the case of transferring the read data, the control section attaches the read error factor information and the read error occurrence address information as headers to the read data to be transferred.

According to still another aspect of the present invention, a method for reproducing data from an information recording medium having a plurality of address regions includes the steps of: performing a reading operation for all of designated address regions among the plurality of address regions while holding read error information regarding the read error in the case where a read error occurs during reading of data from one of the plurality of address regions; transferring the read data to a data conversion device for converting the read data; transferring the read error information to the data conversion device; and changing a method for transferring the read data to the data conversion device according to the read error information.

In one embodiment of the present invention, the read error information includes read error presence/absence information indicating presence/absence of the read error.

In another embodiment of the present invention, the read error information includes read error factor information indicating a factor which caused the read error and read error occurrence address information indicating an address region wherein the read error occurred.

In still another embodiment of the present invention, the read data is real-time data compressed according to a MPEG format; and the data conversion device MPEG-decodes the read data.

In still another embodiment of the present invention, a plurality of GOPs are recorded in the information recording medium; and the step of changing the method for transferring the read data includes a step of restricting the transfer of a GOP including data read from an address region wherein the read error occurred to the data conversion device when the read error factor information indicates a "data reading impossible state".

In one embodiment of the present invention, the step of performing the reading operation includes a step of performing an error detection/correction operation for the data read from the information recording medium and a step of holding the read error factor information indicating an "error correction saturated state" when an error amount of the read data exceeds a capacity of the error detection/correction operation; and the step of changing the method for transferring the read data includes a step of transferring the read data to the data conversion device when the read error factor information indicates the "error correction saturated state".

In another embodiment of the present invention, the step of changing the method for transferring the read data includes a step of: transferring to the reproduction device all of the read data except for a GOP including data read from the address region wherein the read error occurred when data read from an address region wherein the read error occurred is included in an I-picture, and transferring to the reproduction device a GOP including data read from the address region wherein the read error occurred when data read from an address region wherein the read error occurred is included in a B- or P-picture.

In still another embodiment of the present invention, the step of changing the method for transferring the read data includes a step of: transferring to the reproduction device all of the read data except for a GOP including data read from the address region wherein the read error occurred when data read from an address region wherein the read error occurred is included in an I-picture, and transferring to the reproduction device all of the read data except for the B- or P-picture including data read from the address region wherein the read error occurred when data read from an address region wherein the read error occurred is included in a B- or P-picture.

In still another embodiment of the present invention, a plurality of GOPs are recorded in the information recording medium; and the step of changing the method for transferring the read data includes a step of stopping a conversion operation in the data conversion device when the read errors continuously occurs over two or more GOPs.

In still another embodiment of the present invention, the step of stopping the conversion operation includes a step of cautioning that the data conversion device is unusable.

In still another embodiment of the present invention, the step of changing the method for transferring the read data includes a step of changing a method for transferring the read data by an order of a user.

According to still another aspect of the present invention, an information recording medium reproduction apparatus includes: a drive for reading data from an information recording medium having a plurality of address regions, wherein, in the case where a read error occurs during reading of data from one of the plurality of address regions, the drive performs a reading operation for all of designated address regions among the plurality of address regions while holding read error information regarding the read error; and a host system including, a data conversion device for converting the read data, and a CPU for controlling transfer of the read data to the data conversion device according to the read error information.

In one embodiment of the present invention, the read error information includes read error presence/absence information indicating presence/absence of the read error.

In another embodiment of the present invention, the read error information includes read error factor information indicating a factor which caused the read error and read error occurrence address information indicating an address region wherein the read error occurred.

In still another embodiment of the present invention, the data read from the information recording medium is real-time data compressed according to an MPEG format; and the data conversion device MPEG-decodes the read data.

In still another embodiment of the present invention, a plurality of GOPs are recorded in the information recording medium; and when the read error factor information indicates a "data reading impossible state", the CPU restricts data transfer of a GOP including data read from an address region wherein the read error occurred to the data conversion device.

In still another embodiment of the present invention, the drive performs an error detection/correction operation for the data read from the information recording medium and, when an error amount of the read data exceeds a capacity of the error detection/correction operation, holds the read error factor information indicating an "error correction saturated state"; and when the read error factor information indicates an "error correction saturated state", the CPU transfers the read data to the data conversion device.

In still another embodiment of the present invention, when data read from an address region wherein the read error occurred is included in an I-picture, all of the read data except for a GOP including data read from the address region wherein the read error occurred is transferred to the reproduction device, and when data read from an address region wherein the read error occurred is included in a B- or P-picture, a GOP including data read from the address region wherein the read error occurred is transferred to the reproduction device.

In still another embodiment of the present invention, when data read from an address region wherein the read error occurred is included in an I-picture, all of the read data except for a GOP including data read from the address region wherein the read error occurred is transferred to the reproduction device, and when data read from an address region wherein the read error occurred is included in a B- or P-picture, all of the read data except for the B- or P-picture including data read from the address region wherein the read error occurred is transferred to the reproduction device.

In still another embodiment of the present invention, each data read from an address region in the information recording medium includes a plurality of GOPs; and when the read errors continuously occur over two or more GOPs, the data conversion device stops a conversion operation in the data conversion device.

In still another embodiment of the present invention, the information recording medium reproduction apparatus cautions that the data conversion device is unusable when the conversion operation in the data conversion device is stopped.

In still another embodiment of the present invention, the host system further includes a panel control section for sending an order of a user to the CPU.

Thus, the invention described herein makes possible the advantages of (1) providing a drive and a data reading method for reading data for real-time reproduction, such as real-time data, with which read error information may give a significant influence to a reproduction operation; and (2) providing an information recording medium reproduction apparatus and a data reproduction method for reproduction with real-time data.

These and other advantages of the present invention will become apparent to those skilled in the art upon reading and understanding the following detailed description with reference to the accompanying figures.

BRIEF DESCRIPTION OF THE DRAWINGS

FIG. 4 is a flowchart illustrating a data reading method according to embodiment 2 of the present invention.

FIGS. 5A through 5C are flowcharts each illustrating a data reproduction method according to embodiment 3 of the present invention.

DESCRIPTION OF THE PREFERRED EMBODIMENTS

Hereinafter, embodiments of the present invention will be described with reference to the drawings.

(Embodiment 1)

Figure 1:
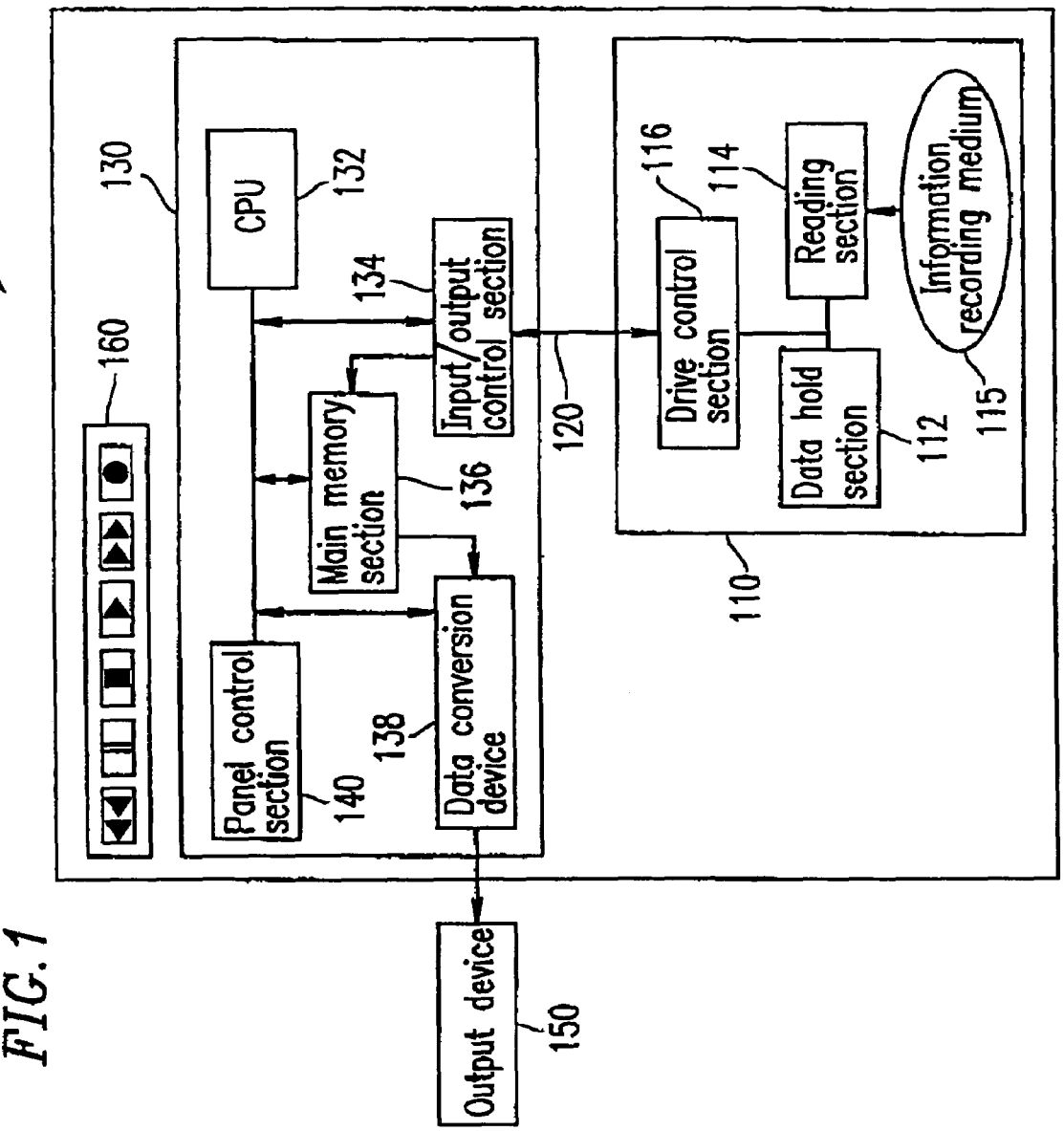
FIG. 1 schematically shows an information recording medium reproduction apparatus of the present invention.

FIG. 1 schematically shows an information recording medium reproduction apparatus 100 of the present invention. The information recording medium reproduction apparatus 100 includes a drive 110, a host system 130, and a connection bus 120 for connecting the drive 110 and the host system 130. The host system 130 is connected to an output device 150. The information recording medium reproduction apparatus 100 may include a panel 160. The panel 160 has an input section including buttons of "reverse", "pause", "stop", "play", "forward", "record", etc., which is an interface with a user.

The host system 130 includes a CPU 132, an input/output control section 134, a main memory section 136, a data conversion device 138, and a panel control section 140. The CPU 132 can access the input/output control section 134, the main memory section 136, the data conversion device 138, and the panel control section 140. The CPU 132 reads and carries out a program stored in the main memory section 136. The data conversion device 138 converts data stored in the main memory section 136, and outputs the converted data to the output device 150. For example, the data conversion device 138 decodes digitally compressed data into analog data and outputs the analog data to the output device 150.

The drive 110 includes a data hold section 112, a reading section 114, and a drive control section 116. An information recording medium 115 is loaded on the drive 110. The information recording medium 115 may be any optical disk such as a DVD-RAM. The drive control section 116 controls the data hold section 112, the reading section 114, and data transmission between the drive 110 and the host system 130. The drive control section 116 also controls an entire operation of the drive 110. The data hold section 112 is a memory which temporarily stores data being transmitted during data transmission between the host system 130 and the reading section 114 in order to increase the speed of the input/output processing. The reading section 114 changes an access position in the information recording medium 115 or performs a reading operation in response to a request from the drive control section 116. Furthermore, when a read error occurred during reading of data, the reading section 114 generates read error information regarding the read error. The read error information is held in the data hold section 112. The drive control section 116 transfers the read error information to the host system 130 through the connection bus 120. In FIG. 1, the CPU 132 determines based on the read error information whether or not the data conversion device 138 should convert data read from an address region wherein the read error occurred. Furthermore, the determination function of the CPU 132 based on the read error information may be included in the data conversion device 138.

The drive control section 116 supplies not only the read error information but also the state of the data hold section 112 to the data conversion device 138 of the host system 130, whereby the data conversion device 138 can perform conversion while considering the amount of data and/or error information stored in the data hold section 112.

The reading section 114 may have an error detection/correction function for correcting an error in the read data. In this case, the reading section 114 generates read error information based on a result of an error detection/correction operation. With the error detection/correction function of the reading section 114, even when there is an error in read data, the error data can be corrected to the correct value. However, the error amount sometimes exceeds the capacity of the error detection/correction function. In such a case, the error data cannot be corrected to a correct value. The reading section 114 determines that a read error occurred and generates read error information.

In the case where data read from the information recording medium is real-time data, a decoder having a motion picture decode function is used as the data conversion device 138 of the host system 130. Video data converted by the data conversion device 138 is output to the output device 150. In the present specification, real-time data is data including at least one of sound data and video data.

In the host system 130, the panel control section 140 receives a request from a user through the pane 160 and passes the request to the CPU 132. In response to a request from the CPU 132, the input/output control section 134 issues a request for the drive 110 from the host system 130 through the connection bus 120, thereby controlling input/output of data.

Figure 2:
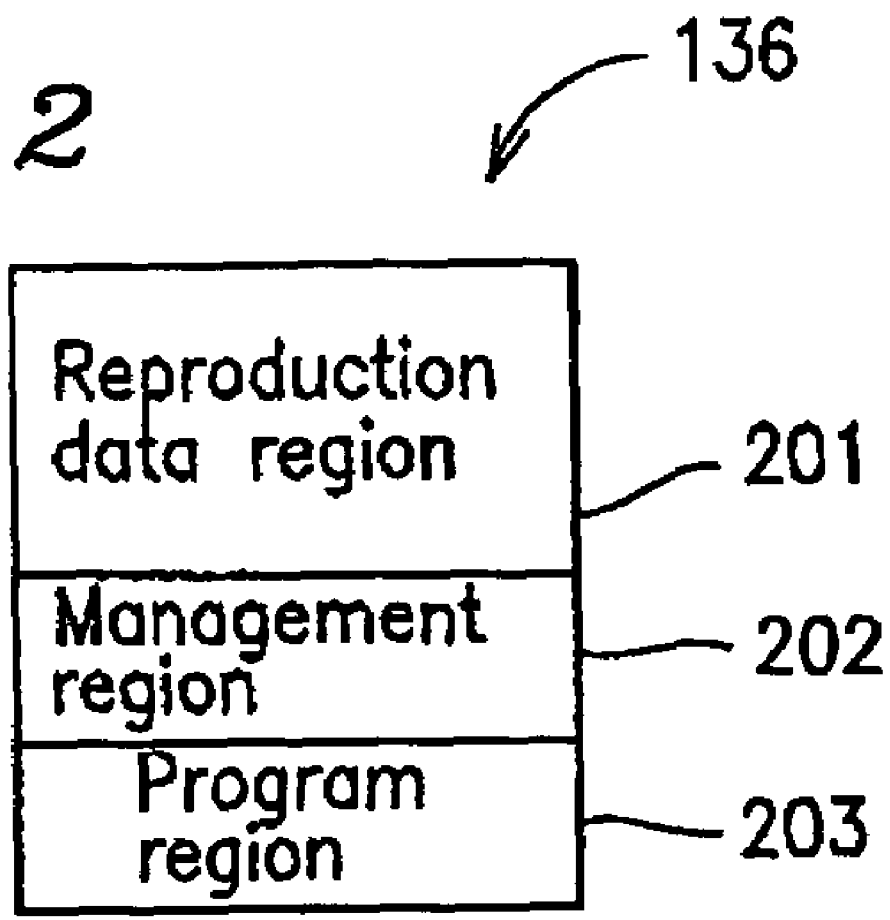
FIG. 2 shows details of a main memory section of a host system.

FIG. 2 shows details of the main memory section 136 of the host system 130. The main memory section 136 includes a reproduction data region 201 for storing data to be converted by the data conversion device 138, a management region 202 used by the CPU 132, a program region 203 for storing a program carried out by the CPU 132.

In the host system 130 having such a structure, a data conversion operation is carried out as described below with reference to FIGS. 1 and 2.

For example, in response to a "play" request from the user through the panel 160, the panel control section 140 of the host system 130 passes the "play" request to the CPU 132. The CPU 132 transfers data read from the information recording medium 115 by the drive 110 to the main memory section 136 through the input/output control section 134 so as to be stored in the reproduction data region 201. Then, the data stored in the reproduction data region 201 is converted by the data conversion device 138.

On the other hand, a read request from the host system 130 requests the drive control section 116 in the drive 110 to carry out a reading operation from all of a plurality of designated address regions. The drive control section 116 allows the reading section 114 to seek the designated address regions, i.e., moves the reading section 114 to a position such as to read data from the designated address regions. The reading section 114 reads data from the plurality of designated address regions in the information recording medium 115, and the read data is temporarily held in the data hold section 112 and transferred to the host system 130.

In the case where a read error occurred during the reading of data from one of the plurality of designated address regions, the reading section 114 generates read error information regarding the read error. The data hold section 112 holds the read error information. The read error information includes, for example, read error presence/absence information indicating whether or not a read error is present, read error factor information indicating a factor which caused the read error, and read error occurrence address information indicating an address region wherein the read error occurred. (However, the read error information is not limited to these information.) For example, the data conversion device 138 performs data conversion based on the read error information, e.g., the read error presence/absence information, whereby the data conversion device 138 can continuously convert data without converting error data.

After reading of data from the designated address regions in the information recording medium 115 has been completed, the drive control section 116 may anticipate another read request and move the reading section 114 to a position such as to read data from an address region subsequent to the address regions from which data has been read. In this position, the reading section 114 reads data from the subsequent address region in the information recording medium 115 and transfers the read data to the data hold section 112.

In the case where data recorded in the information recording medium 115 is real-time data, the data is typically recorded in a series of address regions. Therefore, there is a high possibility of accessing an address region subsequent to the last accessed address region. In this case, if the request is a read request to read data from an address region subsequent to the last accessed address region, the drive control section 116 transfers data held in the data hold section 112 to the data conversion device 138, whereby the data conversion operation can be quickly carried out.

Figure 3:
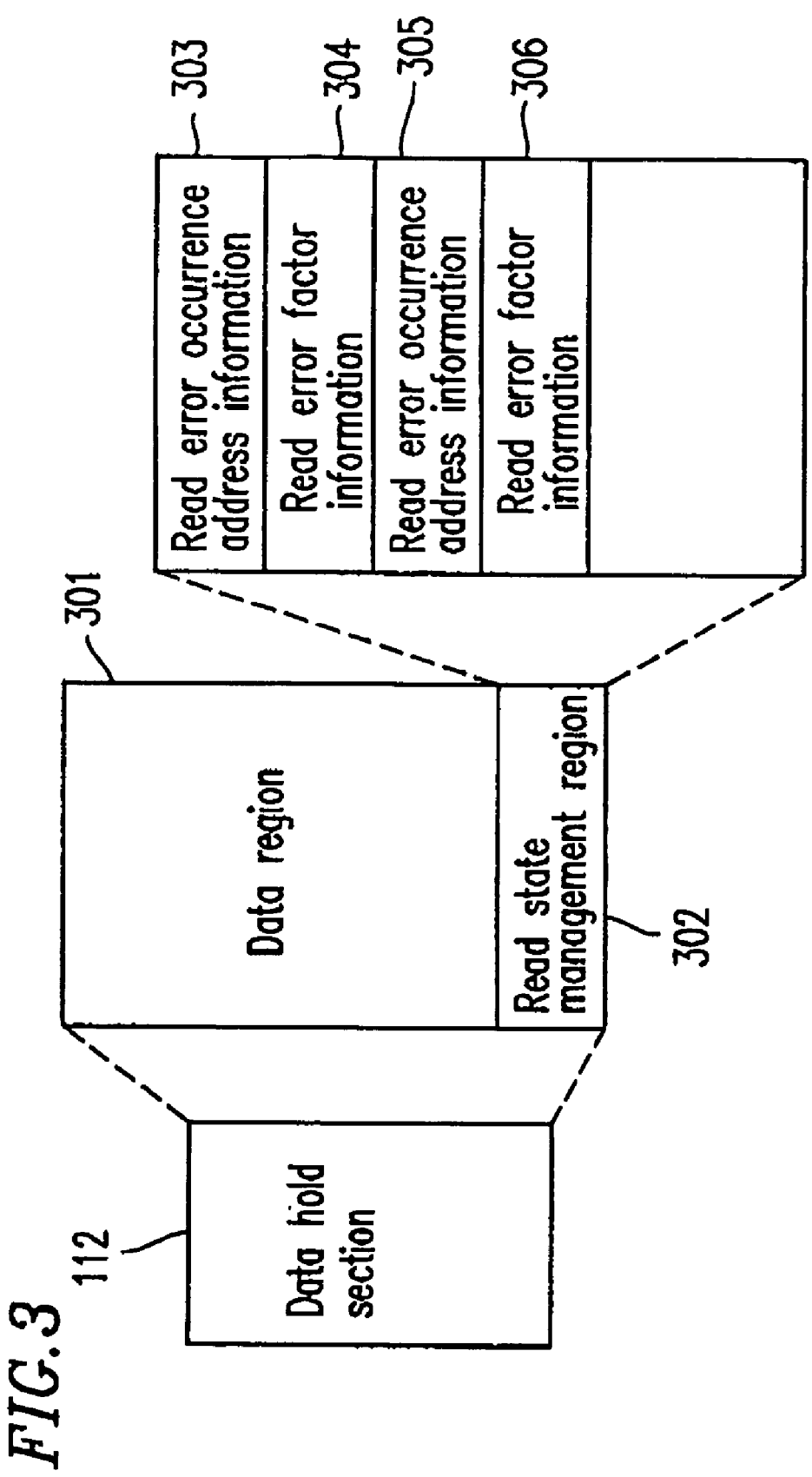
FIG. 3 shows details of a data hold section of a drive.

FIG. 3 shows details of the data hold section 112 of the drive 110. The data hold section 112 includes a data region 301 for holding data read from the information recording medium 115 and a read state management region 302 for holding read error information generated when data held in the data region 301 was read from the information recording medium 115.

Now, as a specific example of the read error information, read error occurrence address information and read error factor information are described with reference to FIGS. 1 and 3. When a first read error occurred, the read state management region 302 in the data hold section 112 receives the first read error occurrence address information 303 and the first read error factor information 304 from the reading section 114. Thereafter, when the second read error occurred, the read state management region 302 receives the second read error occurrence address information 305 and the second read error factor information 306. Afterward, every time a read error occurs, the read state management region 302 receives read error occurrence address information and read error factor information. Whether a read error occurred or not can be determined by checking whether or not data generated due to the occurrence of a read error (e.g., read error occurrence address information and read error factor information) is stored in the read state management region 302, whereby it is not necessary to separately provide read error presence/absence information.

(Embodiment 2)

FIG. 4 is a flowchart illustrating a data reading method according to embodiment 2 of the present invention. Hereinafter, the data reading method according to embodiment 2 will be described with reference to FIGS. 1 and 4.

When reading process is performed, the host system 130 issues to the drive 110 through the connection bus 120 a read request in which a first sector address in the information recording medium 115 from which reading of data is started and a plurality of address regions subsequent to the first sector address are designated (Step 401). In response to the read request, the drive 110 starts reading data from the first sector address (Step 402).

In the case where a read error did not occur during reading of data from the plurality of designated address regions (Step 403), the drive 110 reports to the host system 130 that the reading operation has been completed, and transmits the normally read data to the host system 130 (Step 409), thereby terminating the reading process.

Alternatively, in the case where a read error occurred during reading of data from the plurality of designated address regions (Step 404), the reading section 114 of the drive 110 generates read error information (e.g., read error occurrence address information), and the read error information is held in the data hold section 112 of the drive 110 (Step 405). At this time, if the reading operation has not performed for all of the plurality of designated address regions, the drive 110 restarts the reading operation from an address region subsequent to the address region where the read error occurred (Step 407). Steps 402 through 407 are repeated, whereby the drive 110 can perform the reading operation for all of the designated address regions even when a read error occurs. However, it should be noted that even when the reading operation is performed for all of the designated address regions, all of the data in the designated address regions is not necessarily read out such that information can be correctly reproduced from all of the data.

The above operations are repeated until the reading operation has been completed for all of the designated address regions. In the case where a read error occurred during the reading operation, after the reading operation has been completed for all of the designated address regions (Step 408), the drive 110 sends read error information to the host system 130 in order to report about a possibility that the read data may be not correct, thereby terminating the reading process (Step 410). The read error information may be sent to the host system 130 at a time appropriate for an operation of the data conversion device 138. Alternatively, the timing at which the read error information is sent to the host system 130 may be determined based on the state of the main memory section 136 and/or the data hold section 112.

According to embodiment 2, as described above, a reading operation from the information recording medium 115 is not interrupted even when a read error occurs. Therefore, real-time data reproduction can be easily achieved and maintained. Furthermore, by using the read error occurrence address information as read error information, unreproducible data including an error is prevented from being transferred to the data conversion device 138.

In the above-described example, the read error information is sent to the data conversion device 138 after the reading operation has been completed for all of the designated address regions. However, the read error information may be sent to the data conversion device 138 at any timing so long as the reading of data from the designated address regions is not interrupted.

(Embodiment 3)

Figure 5A:
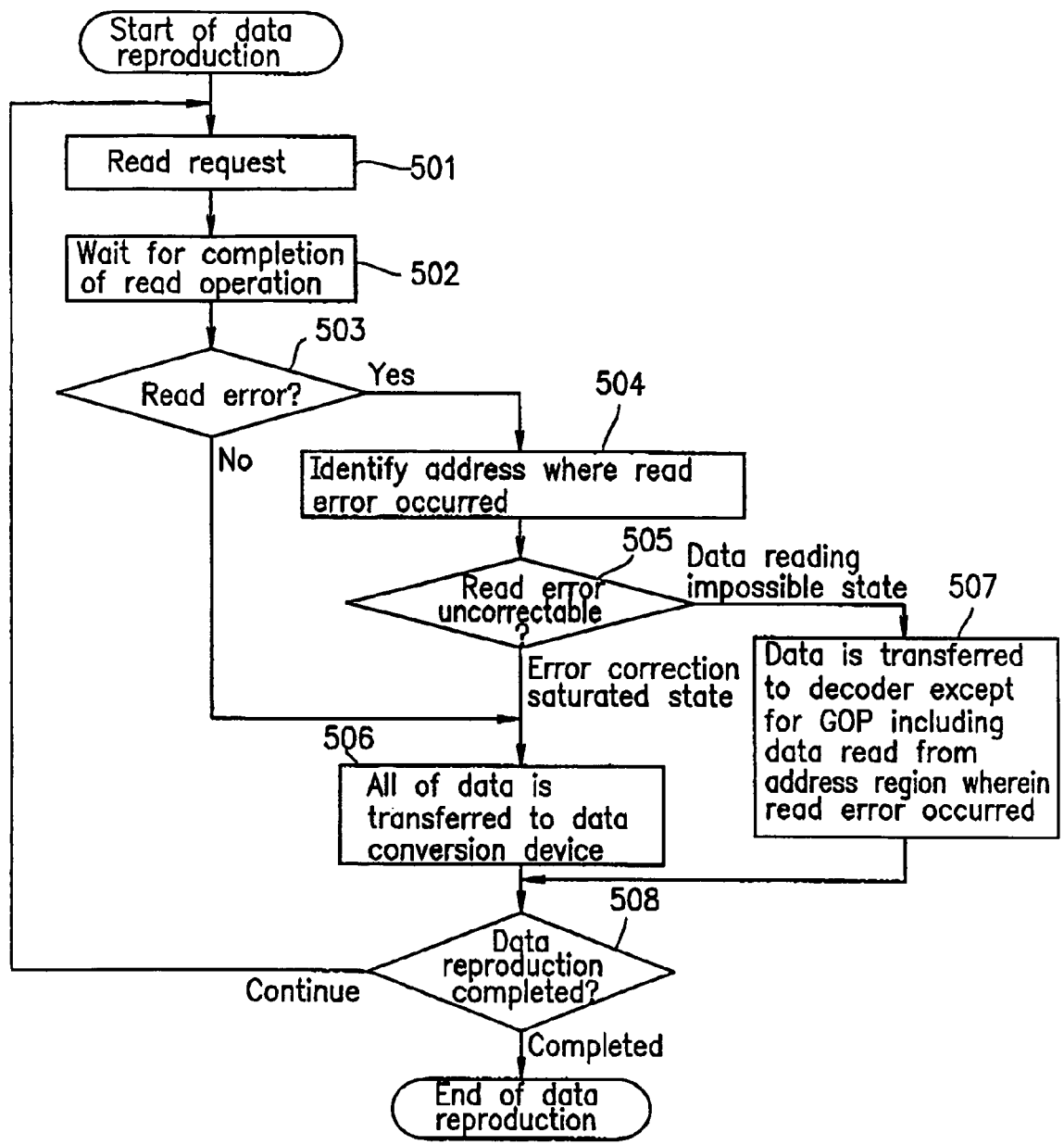
Figure 5B:
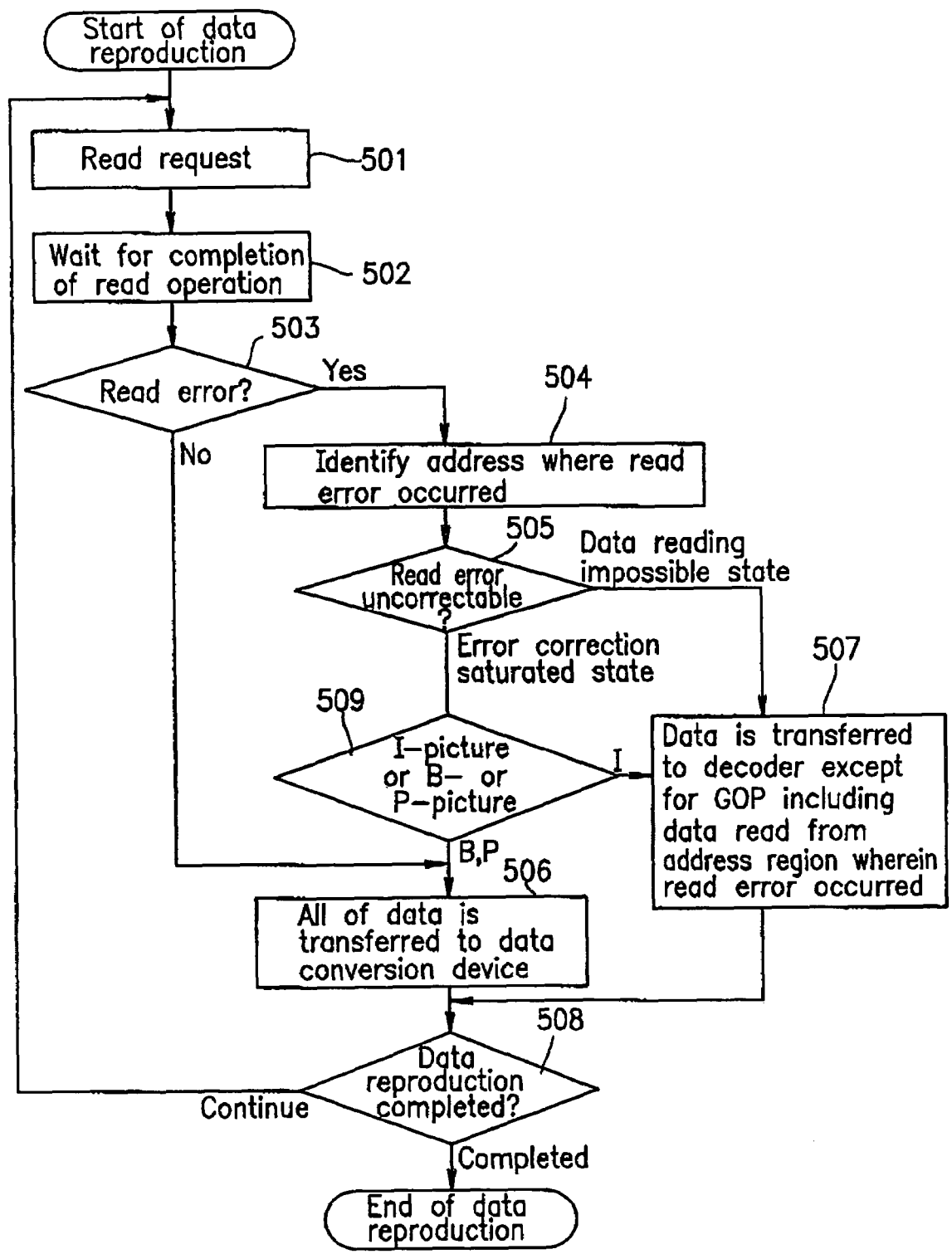
Figure 6:
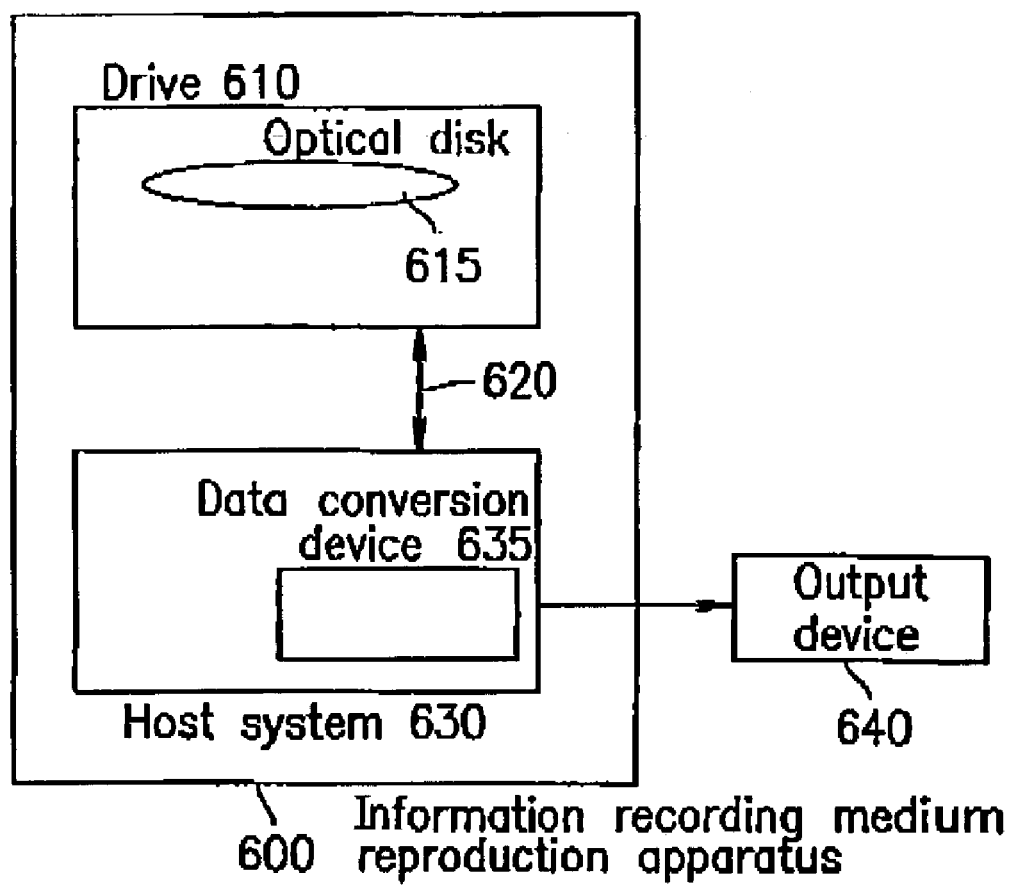
FIG. 6 schematically shows a conventional information recording medium reproduction apparatus.
Figure 7:
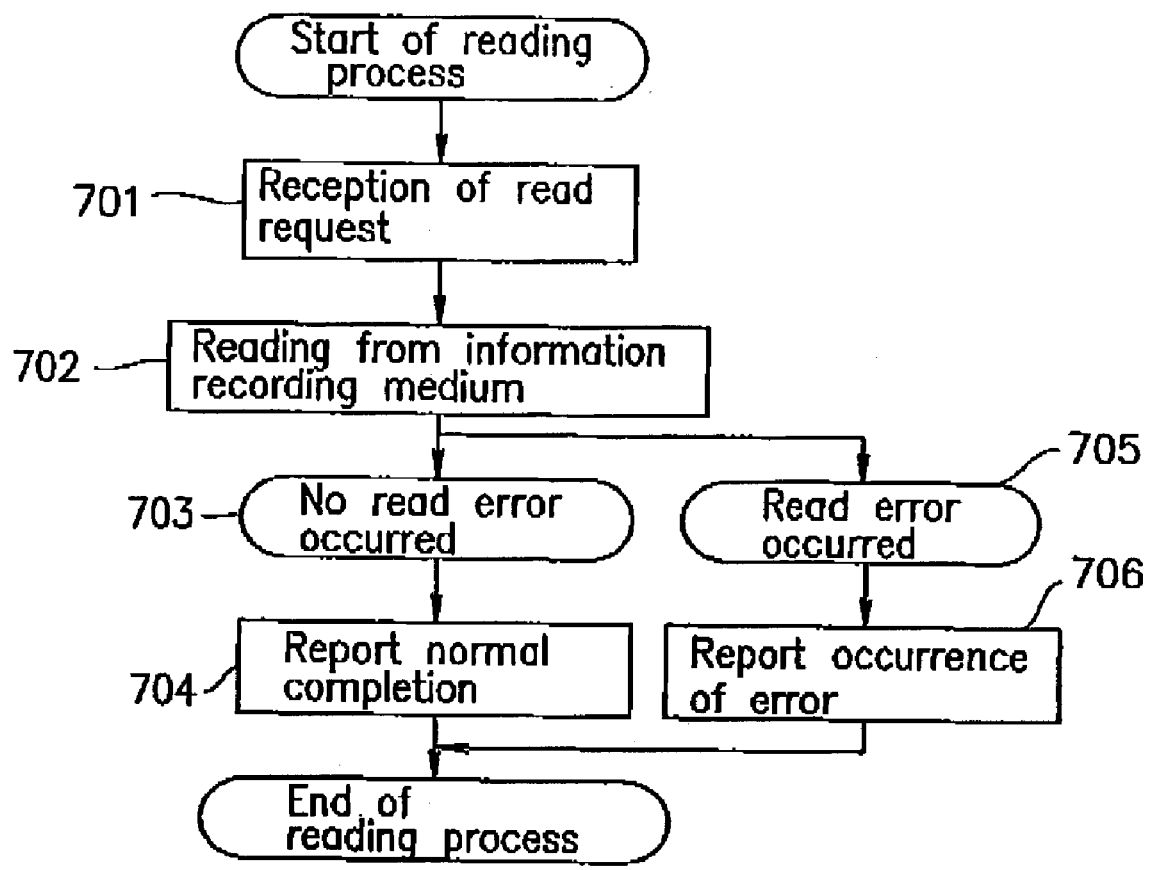
FIG. 7 is a flowchart illustrating a conventional data reading method.
Figure 8:
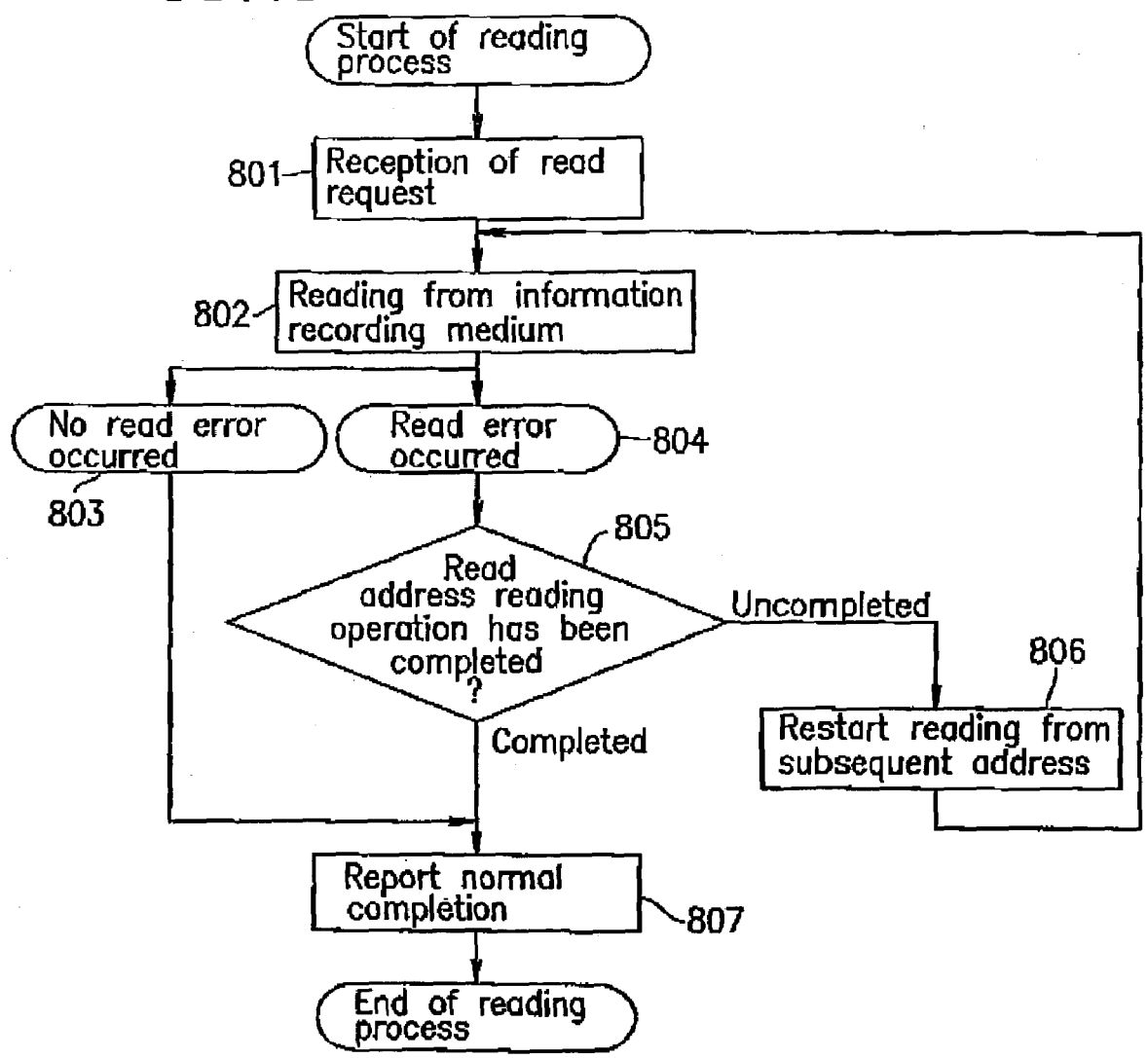
FIG. 8 is a flowchart illustrating another conventional data reading method.
Figure 9:
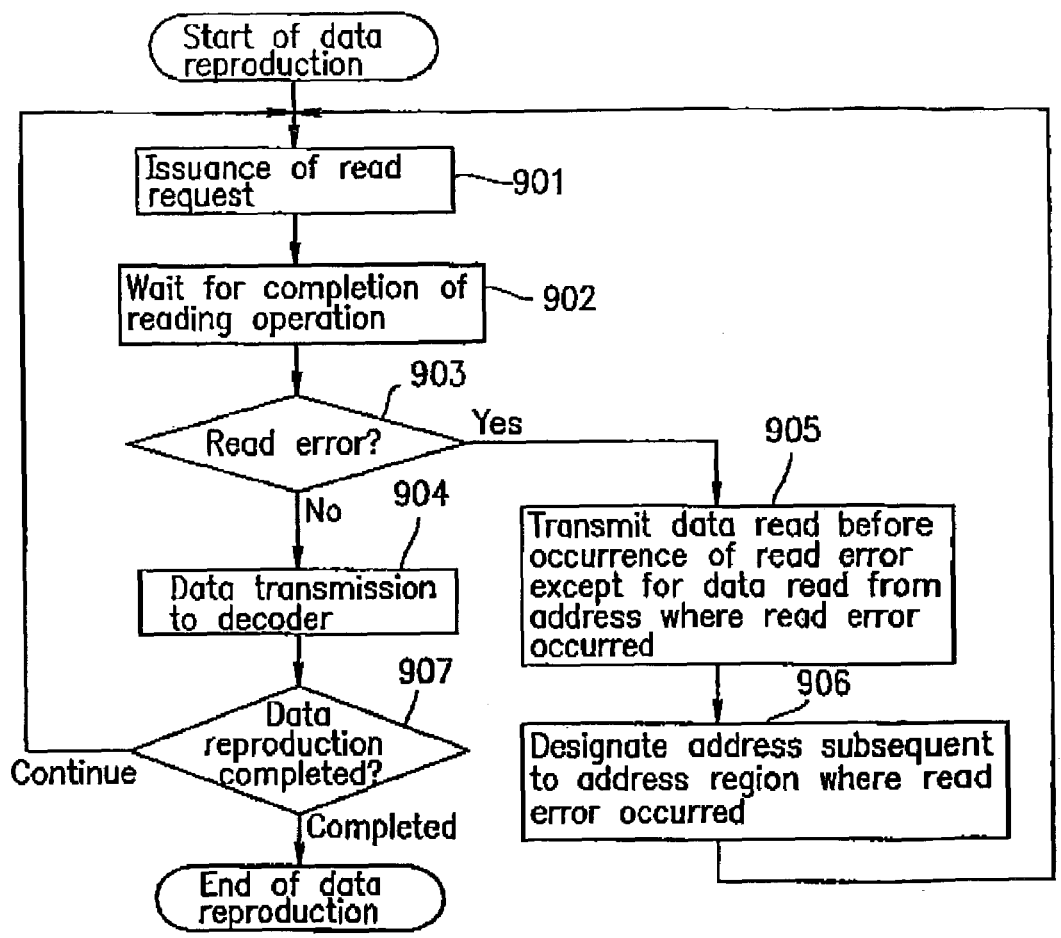
FIG. 9 is a flowchart illustrating a conventional data reproduction method used for a conventional optical disk reproduction apparatus.

FIGS. 5A through 5C are flowcharts each illustrating a data reproduction method according to embodiment 3 of the present invention. Hereinafter, the data reproduction method according to embodiment 3 will be described with reference to FIGS. 1 and 5.

When the information recording medium reproduction apparatus 100 is ordered by a user to reproduce data from the information recording medium 115, the host system 130 issues to the drive 110 a read request in which a first sector address in the information recording medium 115 from which the reading of data is started and a plurality of address regions subsequent to the first sector address are designated (Step 501). After issuing the read request to the drive 110, the host system 130 waits for completion of a read operation (Step 502). After receiving a read operation completion signal from the drive 110, the host system 130 determines whether or not a read error occurred during reading of data (Step 503). In the case where a read error did not occur, the host system 130 transfers the data read from the designated address regions to the data conversion device 138 (Step 506).

In the case where a read error occurred during reading of data from one of the designated address regions, the host system 130 inquires the drive 110 as to which address region the read error occurred in (Step 504). After the address region wherein the read error occurred has been identified, the host system 130 changes a method for transferring data to the data conversion device 138 according to read error factor information ascribed to the read error.

Two factors are mainly assumed as factors based on which the reading section 114 determines that a read error occurred.

The first factor is a defect on the information recording medium 115 such as a flaw, a fingerprint, etc. Such a defect hinders the reading section 114 from reading data from the designated address regions in the information recording medium 115, or causes off-tracking of the reading section 114 on the information recording medium 115. ("Tracking" is an operation carried out by the reading section 114 in order to stably follow a track or a land on the information recording medium 115.) As a result, the reading section 114 determines that a read error occurred. In embodiment 3, when such a read error occurs, a "data reading impossible state" is stored as the read error factor information.

The second factor is reduction in reading performance due to the defect on the information recording medium 115 or the state of data recorded in the information recording medium 115. As described above, the reading section 114 may perform an error detection/correction operation on the data read from the information recording medium 115. Therefore, even when a read error occurred, the error data can be corrected to a correct value with such an error detection/correction function. However, when the error amount is large enough to exceed the capacity of the error detection/correction function, the error data cannot be corrected to a correct value.

When an error correction operation cannot correct the error data to a correct value, the reading section 114 determines that a read error occurred. In embodiment 3, when such a read error occurred, an "error correction saturated state" is stored as the read error factor information.

Hereinafter, it is assumed that the information recording medium 115 is an optical disk containing real-time data compressed according to the MPEG format, and the data conversion device 138 is a decoder for decoding the real-time data. It is needless to say that the present invention is not limited to such a specific example.

Referring again to FIG. 5A in conjunction with FIG. 1, after the address region wherein the read error occurred has been identified at Step 504, a factor that caused the read error is determined (Step 505).

When data could not read due to a flaw on the optical disk 115 or a failure in the drive 110, i.e., when the read error factor information indicates "data reading impossible state", the read data is transferred to the decoder 138 except for a GOP (Group of Pictures) including the data read from the address wherein the read error occurred (Stop 507). ("GOP" is a unit for picture data based on the MPEG format, which is a group formed by a plurality of pictures.) Data read from each address region in the optical disk 115 includes a plurality of GOPs. After the data has been transferred to the decoder 138, it is determined whether or not the data reproduction has been completed (Step 508).

Alternatively, the error amount in the read data due to a defect on the optical disk 115 or the state of data recorded in the optical disk 115 exceeds the capacity of the error detection/correction function of the drive 110, i.e., when the read error factor information indicates the "error correction saturated state", all of the read data is transferred to the decoder 138 in expectation of the decoding capacity of the decoder 138 (Step 506). Even data which could not be corrected by the error detection/correction function in the reading section 114 of the drive 110 may be decodable by the decoder 138 because at least a portion of the data is considered as correctly read data. On the other hand, data which has been recognized as being in the "data reading impossible state" is undecodable (unreproducible). Therefore, it is anticipated that even when the data is decoded, an appropriate image cannot be reproduced. In the case where the data reproduction is not completed after the data has been transferred to the decoder 138 (Step 508), Steps 501 through 508 are repeated until the data reproduction is completed.

As described hereinabove, according to embodiment 3, read error information generated by the reading section 114 of the drive 110 is effectively utilized for controlling data transfer such that data transfer to the decoder 138 is restricted, i.e., unreproducible error data is not transferred to the decoder 138. With such an arrangement, a time period required for conversion in the decoder 138 can be shortened, and as a result, real-time data reproduction can be achieved and maintained.

In the above example, when a read error information is "data reading impossible state", the read data is transferred to the decoder 138 except for a GOP including the data read from the address wherein the read error occurred. Alternatively, according to the present invention, in the case where the read error information is the "error correction saturated state": when data read from an address region where in the read error occurred is included in an I-picture, all of the read data except for a GOP including data read from the address region wherein the read error occurred is transferred to the decoder 138; and when data read from an address region wherein the read error occurred is not included in an I-picture, all of the read data is transferred to the decoder 138. (It should be noted that a GOP typically includes an I-picture, a B-picture, and a P-picture.)

FIG. 5B is a flowchart illustrating another data reproduction method according to embodiment 3. In this data reproduction method, when read error factor information indicates the "error correction saturated state", it is determined whether the data read from an address wherein a read error occurred is included in an I-picture or not. The data reproduction method of FIG. 5B is different from the data reproduction method of FIG. 5A in that the data reproduction method of FIG. 5B includes Step 509 between Step 505 and Step 506.

At Step 505, the read error factor information indicates "error correction saturated state", the CPU 132 or the decoder 138 determines whether data read from an address wherein a read error occurred is included in an I-picture or B- or P-picture (Step 509). When data read from an address region wherein the read error occurred is included in an I-picture, all of the read data except for a GOP including data read from the address region wherein the read error occurred is transferred to the decoder 138 (Step 507). When data read from an address region wherein the read error occurred is included in a B- or P-picture (i.e., not an I-picture), all of the read data is transferred to the decoder 138 in expectation of the decoding capacity of the decoder 138 (Step 506).

The I-picture is a reference image, and therefore, even a small error in the I-picture may give a significant influence to other pictures. Thus, it is preferable that all of the read data except for a GOP including data read from the address region wherein the read error occurred is transferred to the decoder 138. On the other hand, a B-picture and P-picture are predicted based on the I-picture. Thus, even if all of the read data is transferred to the decoder 138 (Step 506), an error data does not gives so much influence to an output operation so long as the data of the I-picture itself is correct.

Alternatively, as shown in FIG. 5C, the present invention is arranged such that when data read from the address region wherein the read error occurred is included in a B- or P-picture, all of the read data except for the B- or P-picture read from the address region wherein the read error occurred is transferred to the decoder 138 (Step 510).

In the above example according to embodiment 3, the host system 130 inquires the drive 110 as to which address region the read error occurred in (Step 504). According to the present invention, read error information may be attached to the read data as a header in order to inform about a read error, whereby a similar effect can be obtained. However, when the read error information is attached to the read data as a header, although the possibility that a read error occurs is decreased in general, it is necessary to attach a header to each data. Therefore, in this case, almost all the headers have read error information informing that no read error occurred. Thus, the read error information is only necessary to be given from the drive 110 at an appropriate time during a data reproduction operation of the host system 130.

As described above, according to the present invention, read error information obtained from the drive 110 is effectively utilized for controlling data transfer such that unreproducible error data is not transferred to the data conversion device 138. With such an arrangement, a time period required for conversion in the data conversion device 138 can be shortened, and as a result, real-time data reproduction can be achieved and maintained.

Furthermore, when read errors continuously occur over two or more GOPs, data conversion cannot be performed sufficiently to provide output information. In such a case, a data conversion operation of the data conversion device 138 can be stopped. Specifically, since a time required to convert one GOP is typically about 0.5 to 1.0 second. If 5 or 6 read errors occurred (i.e., about 3 seconds), output information may not be provided on a real-time basis, and in such a case, the conversion operation of the data conversion device 138 can be stopped. Furthermore, in such a case, since there is a possibility that the read errors occurred due to dirt on the optical disk 115, such as a fingerprint, etc., the information recording medium reproduction apparatus 100 may provide a cautionary alarm, for example, "There is a possibility that the optical disk is dirty due to a fingerprint, etc. Clean the disk, and play again." Such a cautionary alarm can enlighten a user about handling of the disks.

In the above description, real-time data is mainly used as an example of data, but the present invention is not limited thereto. However, real-time data needs to be used for reproduction on a real-time basis, and therefore is preferable data to which the present invention is applied.

As described above, according to the present invention, even when a read error occurred during a reading operation, the reading operation is not stopped. Therefore, data to be transferred to a data conversion device can be continuously obtained, and accordingly, real-time reproduction can be easily achieved and maintained. Furthermore, read error information obtained from a drive is effectively utilized, whereby interruption of a reproduction process or disturbance in information reproduced from data output from a data conversion device (e.g., motion picture) can be suppressed.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for reading data from an information recording medium having a plurality of address regions, comprising the steps of:
   performing a reading operation for all of designated address regions among the plurality of address regions while holding read error information regarding the read error in the case where a read error occurs during reading of data from one of the plurality of address regions;
   transferring the read data to a data conversion device for converting the read data; and
   transferring the read error information to the data conversion device,
   wherein, when not in an "error correction saturated state", any unreproducible error data corresponding to the read error information is prevented from being transferred to the data conversion device.

2. A method for reading data according to claim 1, wherein the read error information includes read error presence and absence information indicating presence and absence of the read error.

3. A method for reading data according to claim 1, wherein the read error information includes read error factor information indicating a factor which caused the read error and read error occurrence address information indicating an address region wherein the read error occurred.

4. A method for reading data according to claim 3, wherein:
   the step of performing the reading operation includes holding the read data; and
   the step of transferring the read error information includes a step of transferring the read error occurrence address information and a state of the held data to the data conversion device.

5. A method for reading data according to claim 3, wherein the step of transferring the read error information includes a step of attaching the read error occurrence address information and the read error factor information as headers to the data read from the information recording medium.

6. A drive, comprising:
   a reading section for reading data from an information recording medium having a plurality of address regions, wherein, in the case where a read error occurs during reading of data from one of the plurality of address regions, the reading section generates read error information regarding the read error, and the reading section performs a reading operation for all of designated address regions among the plurality of address regions;
   a data holding section for holding the read data and the read error information; and
   a control section for controlling the reading section and the data holding section, wherein the control section transfers the read data to a data conversion device for converting the read data, and the control section transfers the read error information to the data conversion device,
   wherein, when not in an "error correction saturated state", any unreproducible error data corresponding to the read error information is prevented from being transferred to the data conversion device.

7. A drive according to claim 6, wherein the read error information includes read error presence and absence information indicating presence and absence of the read error.

8. A drive according to claim 6, wherein the read error information includes read error factor information indicating a factor which caused the read error and read error occurrence address information indicating an address region wherein the read error occurred.

9. A drive according to claim 8, wherein the control section transfers the read error occurrence address information and a state of the held data to the data conversion device.

10. A drive according to claim 8, wherein, in the case of transferring the read data, the control section attaches the read error factor information and the read error occurrence address information as headers to the read data to be transferred.

11. A method for reproducing data from an information recording medium having a plurality of address regions, comprising the steps of:
    performing a reading operation for all of designated address regions among the plurality of address regions while holding read error information regarding the read error in the case where a read error occurs during reading of data from one of the plurality of address regions;
    transferring the read data to a data conversion device for converting the read data;
    transferring the read error information to the data conversion device; and
    changing a method for transferring the read data to the data conversion device according to the read error information,
    wherein, when not in an "error correction saturated state", any unreproducible error data corresponding to the read error information is prevented from being transferred to the data conversion device.

12. A method for reproducing data according to claim 11, wherein the read error information includes read error presence and absence information indicating presence and absence of the read error.

13. A method for reproducing data according to claim 11, wherein the read error information includes read error factor information indicating a factor which caused the read error and read error occurrence address information indicating an address region wherein the read error occurred.

14. A method for reproducing data according to claim 13, wherein:
    the read data is real-time data compressed according to a MPEG format; and
    the data conversion device MPEG-decodes the read data.

15. A method for reproducing data according to claim 14, wherein:
    a plurality of GOPs are recorded in the information recording medium; and
    the step of changing the method for transferring the read data includes a step of restricting the transfer of a GOP including data read from an address region wherein the read error occurred to the data conversion device when the read error factor information indicates a "data reading impossible state".

16. A method for reproducing data according to claim 14, wherein:

the step of performing the reading operation includes a step of performing an error detection and correction operation for the data read from the information recording medium and a step of holding the read error factor information indicating the "error correction saturated state" when an error amount of the read data exceeds a capacity of the error detection and correction operation; and the step of changing the method for transferring the read data includes a step of transferring the read data to the data conversion device when the read error factor information indicates the "error correction saturated state".

17. A method for reproducing data according to claim 16, wherein the step of changing the method for transferring the read data includes a step of:

transferring to the reproduction device all of the read data except for a GOP including data read from the address region wherein the read error occurred when data read from an address region wherein the read error occurred is included in an I-picture, and transferring to the reproduction device a GOP including data read from the address region wherein the read error occurred when data read from an address region wherein the read error occurred is included in a B- or P-picture.

18. A method for reproducing data according to claim 16, wherein the step of changing the method for transferring the read data includes a step of:

transferring to the reproduction device all of the read data except for a GOP including data read from the address region wherein the read error occurred when data read from an address region wherein the read error occurred is included in an I-picture, and transferring to the reproduction device all of the read data except for the B- or P-picture including data read from the address region wherein the read error occurred when data read from an address region wherein the read error occurred is included in a B- or P-picture.

19. A method for reproducing data according to claim 14, wherein:

a plurality of GOPs are recorded in the information recording medium; and the step of changing the method for transferring the read data includes a step of stopping a conversion operation in the data conversion device when the read errors continuously occurs over two or more GOPs.

20. A method for reproducing data according to claim 19, wherein the step of stopping the conversion operation includes a step of cautioning that the data conversion device is unusable.

21. A method for reproducing data according to claim 11, wherein the step of changing the method for transferring the read data includes a step of changing a method for transferring the read data by an order of a user.

22. An information recording medium reproduction apparatus, comprising:

a drive for reading data from an information recording medium having a plurality of address regions, wherein, in the case where a read error occurs during reading of data from one of the plurality of address regions, the drive performs a reading operation for all of designated address regions among the plurality of address regions while holding read error information regarding the read error; and a host system including, a data conversion device for converting the read data, and a CPU for controlling transfer of the read data to the data conversion device according to the read error information, wherein, when not in an "error correction saturated states", any unreproducible error data corresponding to the read error information is prevented from being transferred to the data conversion device.

23. An information recording medium reproduction apparatus according to claim 22, wherein the read error information includes read error presence and absence information indicating presence and absence of the read error.

24. An information recording medium reproduction apparatus according to claim 22, wherein the read error information includes read error factor information indicating a factor which caused the read error and read error occurrence address information indicating an address region wherein the read error occurred.

25. An information recording medium reproduction apparatus according to claim 24, wherein:

the data read from the information recording medium is real-time data compressed according to an MPEG format; and the data conversion device MPEG-decodes the read data.

26. An information recording medium reproduction apparatus according to claim 25, wherein:

a plurality of GOPs are recorded in the information recording medium; and when the read error factor information indicates a "data reading impossible state", the CPU restricts data transfer of a GOP including data read from an address region wherein the read error occurred to the data conversion device.

27. An information recording medium reproduction apparatus according to claim 25, wherein:

the drive performs an error detection and correction operation for the data read from the information recording medium and, when an error amount of the read data exceeds a capacity of the error detection and correction operation, holds the read error factor information indicating the "error correction saturated states"; and when the read error factor information indicates the "error correction saturated state", the CPU transfers the read data to the data conversion device.

28. An information recording medium reproduction apparatus according to claim 27, wherein:

when data read from an address region wherein the read error occurred is included in an I-picture, all of the read data except for a GOP including data read from the address region wherein the read error occurred is transferred to the reproduction device, and when data read from an address region wherein the read error occurred is included in a B- or P-picture, a GOP including data read from the address region wherein the read error occurred is transferred to the reproduction device.

29. An information recording medium reproduction apparatus according to claim 27, wherein:

when data read from an address region wherein the read error occurred is included in an I-picture, all of the read data except for a GOP including data read from the address region wherein the read error occurred is transferred to the reproduction device, and when data read from an address region wherein the read error occurred is included in a B- or P-picture, all of the read data except for the B- or P-picture including data read from the address region wherein the read error occurred is transferred to the reproduction device.

30. An information recording medium reproduction apparatus according to claim 25, wherein:
each data read from an address region in the information recording medium includes a plurality of GOPs; and
when the read errors continuously occur over two or more GOPs, the data conversion device stops a conversion operation in the data conversion device.

31. An information recording medium reproduction apparatus according to claim 30, which cautions that the data conversion device is unusable when the conversion operation in the data conversion device is stopped.

32. An information recording medium reproduction apparatus according to claim 22, wherein the host system further includes a panel control section for sending an order of a user to the CPU.

33. A method for reading data according to claim 5, wherein the read error occurrence address information used as read error information is used to prevent the unreproducible error data from being transferred to the data conversion device.

34. A drive according to claim 10, wherein the read error occurrence address information used as read error information is used to prevent the unreproducible error data from being transferred to the data conversion device.

* * * * *

UNITED STATES PATENT AND TRADEMARK OFFICE
CERTIFICATE OF CORRECTION

| | | |
|---|---|---|
| PATENT NO. | : 6,999,386 B2 | Page 1 of 1 |
| APPLICATION NO. | : 09/808641 | |
| DATED | : February 14, 2006 | |
| INVENTOR(S) | : Hiroshi Sugimoto et al. | |

It is certified that error appears in the above-identified patent and that said Letters Patent is hereby corrected as shown below:

Column 18, lines 8 and 44, "states" should read -- state --.

Signed and Sealed this

Twentieth Day of February, 2007

JON W. DUDAS
*Director of the United States Patent and Trademark Office*